United States Patent
Okumura

(10) Patent No.: US 7,131,321 B2
(45) Date of Patent: Nov. 7, 2006

(54) THROTTLE SYSTEM ABNORMALITY DETERMINATION APPARATUS

(75) Inventor: Hiroshi Okumura, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/015,669

(22) Filed: Dec. 20, 2004

(65) Prior Publication Data

US 2005/0138997 A1 Jun. 30, 2005

(30) Foreign Application Priority Data

Dec. 24, 2003 (JP) ............................. 2003-427549

(51) Int. Cl.
*G01M 15/00* (2006.01)

(52) U.S. Cl. ....................... 73/118.1; 73/116; 73/117.2; 73/117.3

(58) Field of Classification Search ..................... None
See application file for complete search history.

(56) References Cited

U.S. PATENT DOCUMENTS 4,854,283 A  8/1989  Kiyono et al. .............. 123/361
6,352,064 B1 *  3/2002  Tomita et al. .............. 123/396
6,655,357 B1 *  12/2003  Murakami et al. .......... 123/479
6,752,128 B1 *  6/2004  Ozeki et al. ................ 123/479
6,848,420 B1 *  2/2005  Ishiguro et al. ............. 123/399

\* cited by examiner

*Primary Examiner*—Edward Lefkowitz
*Assistant Examiner*—Freddie Kirkland, III
(74) *Attorney, Agent, or Firm*—Nixon & Vanderhye, P.C.

(57) ABSTRACT

An abnormality determination apparatus of a throttle control system calculates an integrated value of a deviation between an actual throttle angle and a target throttle angle. The abnormality determination apparatus determines existence or nonexistence of an abnormality in the throttle control system by comparing the integrated value with an abnormality determination value. The abnormality determination value is changed so that the abnormality determination value becomes smaller in a low-speed traveling period than in a high-speed traveling period. Thus, in the low-speed traveling period, in which an influence of the abnormality in the throttle control system on an operating state of an engine becomes larger than in the high-speed traveling period, the abnormality in the throttle control system can be detected and failsafe processing can be started in an early stage of the abnormality.

20 Claims, 6 Drawing Sheets

THROTTLE SYSTEM ABNORMALITY DETERMINATION APPARATUS

CROSS REFERENCE TO RELATED APPLICATION

This application is based on and incorporates herein by reference Japanese Patent Application No. 2003-427549 filed on Dec. 24, 2003.

BACKGROUND OF THE INVENTION

1. Field of the Invention

The present invention relates a throttle system abnormality determination apparatus for determining existence or nonexistence of an abnormality in a throttle control system, which controls a throttle valve of an internal combustion engine, or in parts related to the throttle control system.

2. Description of Related Art

A certain internal combustion engine mounted to a vehicle has an electronic throttle control system for electronically controlling a throttle angle (an opening degree of a throttle valve) TH. The system includes a throttle motor for driving the throttle valve. The system calculates a target throttle angle based on an amount of manipulation of an accelerator and others, and senses an actual throttle angle by a throttle position sensor. Thus, the system controls the throttle motor to make the actual throttle angle follow the target throttle angle.

An abnormality determination apparatus for the above throttle control system disclosed in Japanese Patent Gazette No. H07-74623 (page 1, etc.) (Patent Document 1) calculates an integrated value DEV of a deviation between the actual throttle angle and the target throttle angle and compares the integrated value DEV with a predetermined abnormality determination value. Thus, the abnormality determination apparatus determines existence or nonexistence of an abnormality in the throttle control system. The abnormality determination apparatus of Patent Document 1 changes the abnormality determination value in accordance with temperature of the throttle motor when the apparatus determines the existence or nonexistence of the abnormality. Thus, the abnormality determination apparatus avoids erroneous determination due to a delay in response, which is caused when the temperature of the throttle motor is low.

Generally, if it is determined that the abnormality exists in the throttle control system, the abnormality determination apparatus of the throttle control system performs failsafe processing for turning off energization of the throttle motor and for compulsorily holding the throttle angle at a predetermined throttle angle by a spring and the like. For instance, the predetermined throttle angle is an angle at which an air intake quantity necessary for the vehicle to travel to a safe place can be ensured.

Generally, the target throttle angle becomes smaller in a low-speed traveling period (in which a vehicle travels at a low speed) than in a high-speed traveling period (in which the vehicle travels at a high speed). Therefore, even if an amount of abnormal operation of the actual throttle angle TH due to the abnormality in the throttle control system is the same, a ratio of the deviation of the actual throttle angle with respect to the target throttle angle becomes greater in the low-speed traveling period than in the high-speed traveling period. Therefore, a ratio of a change in an operating state of an internal combustion engine (for instance, a ratio of a change in a vehicle speed Vs) caused by the abnormal operation of the actual throttle angle is apt to increase in the low-speed traveling period.

In the abnormality determination performed by the throttle control system of Patent Document 1, the abnormality determination value becomes constant when the temperature of the throttle motor becomes constant after warming up of the engine finishes. Therefore, the abnormality determination value shown by a double-dashed line FLD' in FIG. 4 used in the high-speed traveling period is also used in the low-speed traveling period. In FIG. 4, a broken line THtgt indicates the target throttle angle. In FIG. 4, a solid line THact' indicates the actual throttle angle of the throttle control system of Patent Document 1, and a solid line DEV' is the integrated value of the deviation between the target throttle angle THtgt and the actual throttle angle THact'. If an abnormality in which the actual throttle angle THact' increases with respect to the target throttle angle THtgt occurs in the throttle control system of Patent Document 1, it will be determined that the abnormality exists at a time point t1 when the integrated value DEV' exceeds the abnormality determination value FLD', which is the same as the abnormality determination value FLD' used in the high-speed traveling period, even in the low-speed traveling period. Then, the failsafe processing will be started. A flag FLAG' indicating the existence of the abnormality is set at 1 at the time point t1 as shown by a solid line f' in FIG. 4. However, as explained above, the abnormality in the throttle control system occurring in the low-speed period has a significant influence on the operating state of the engine. Therefore, the rate of the increase in the vehicle speed Vs due to the abnormal operation of the actual throttle angle THact', which is performed during a period from a time point when the abnormality is generated to the time point t1 when it is determined that the abnormality exists, is increased as shown by a solid line v' in FIG. 4. As a result, there is a possibility that a vehicle driver feels deterioration of drivability such as acceleration shock.

SUMMARY OF THE INVENTION

It is therefore an object of the present invention to provide an abnormality determination apparatus of a throttle system capable of detecting an abnormality in the throttle system in its early stage if the abnormality occurs in an operating area where the abnormality in the throttle system has a significant influence on an operating state of an internal combustion engine. Thus, the abnormality determination apparatus can start suitable failsafe processing before drivability is deteriorated largely.

According to an aspect of the present invention, an abnormality determination apparatus of a throttle control system has determining means and changing means. The throttle control system includes a throttle valve of an internal combustion engine mounted in a vehicle and a throttle actuator for actuating the throttle valve. The throttle control system controls the throttle actuator to control an angle of the throttle valve. The determining means determines existence or nonexistence of an abnormality in a throttle system including the throttle control system and parts related to the throttle control system, based on an abnormality determination condition. The changing means changes the abnormality determination condition in accordance with operating states of the vehicle and/or the engine.

A degree of the influence of the abnormality in the throttle system on the operating state of the internal combustion engine changes in accordance with the operating states of the vehicle and/or the engine. Therefore, by changing the abnormality determination condition in accordance with the operating states of the vehicle and/or the engine, the abnormality determination condition can be changed so that the abnormality in the throttle system can be detected in its early stage in an area where the influence of the abnormality in the throttle system on the operating state of the engine increases. Thus, if the abnormality occurs in the throttle system in the area where the influence of the abnormality in the throttle system on the operating state of the engine increases, the abnormality can be detected in its early stage and suitable failsafe processing can be started before the drivability is deteriorated largely. Thus, the drivability at the time when the abnormality occurs in the throttle system can be improved. In an area where the influence of the abnormality in the throttle system on the operating state of the engine is small, the abnormality determination condition is changed to improve the abnormality determination accuracy. Accordingly, the abnormality in the throttle system can be determined accurately.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS (First Embodiment)

Figure 1:
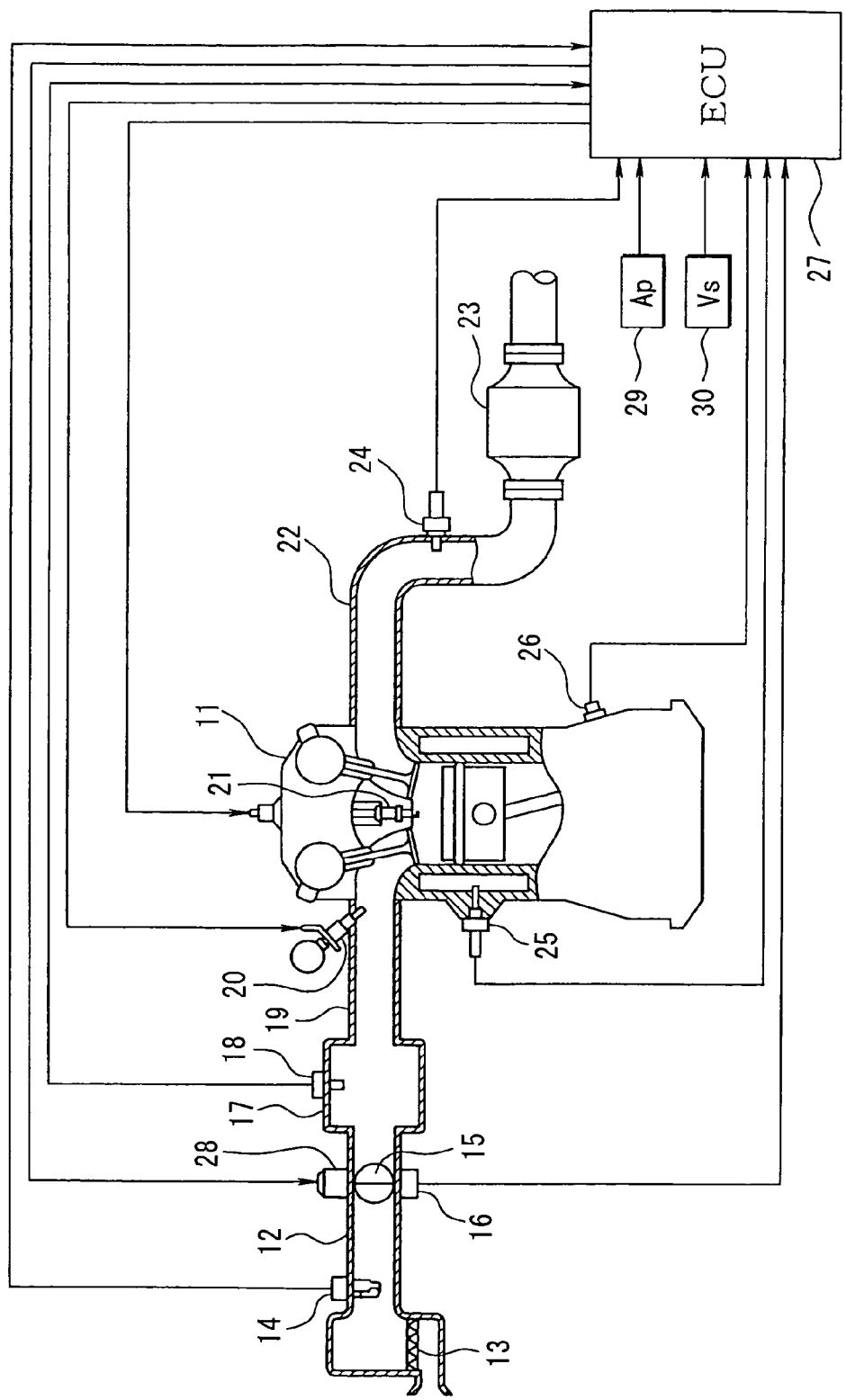
FIG. 1 is a schematic diagram showing an engine control system according to a first embodiment of the present invention.

Referring to FIG. 1, an engine control system according to a first embodiment of the present invention is illustrated. As shown in FIG. 1, an air cleaner 13 is disposed in the most upstream portion of an intake pipe 12 of an internal combustion engine 11. An air flow meter 14 for sensing an air intake quantity is disposed downstream of the air cleaner 13. A throttle valve 15 and a throttle position sensor 16 are disposed downstream of the air flow meter 14. A throttle motor (a throttle actuator) 28 such as a DC motor regulates an angle of the throttle valve 15. The throttle position sensor 16 senses the angle of the throttle valve 15 (a throttle opening degree).

A surge tank 17 is disposed downstream of the throttle valve 15. An intake pipe pressure sensor 18 for sensing an intake pipe pressure (a pressure in the intake pipe 12) is mounted to the surge tank 17. An intake manifold 19 for leading the air into respective cylinders of the engine 11 is connected to the surge tank 17. Fuel injection valves 20 for injecting fuel are respectively mounted near intake ports of the intake manifold 19 corresponding to the respective cylinders. Ignition plugs 21 are mounted to a cylinder head of the engine 11 in accordance with the respective cylinders. Each ignition plug 21 discharges a spark to ignite gas mixture in the cylinder.

A catalyst 23 such as a three-way catalyst is disposed in an exhaust pipe 22 of the engine 11 for purifying carbon monoxide, hydrocarbon, nitrogen oxides, etc. included in the exhaust gas. An exhaust gas sensor 24 (an air-fuel ratio sensor, an oxygen sensor or the like) for sensing an air-fuel ratio of the exhaust gas, or richness or leanness of the exhaust gas, is disposed upstream of the catalyst 23.

A cooling water temperature sensor 25, a crank angle sensor 26 and the like are mounted to a cylinder block of the engine 11. The cooling water temperature sensor 25 senses cooling water temperature. The crank angle sensor 26 outputs a pulse signal every time a crankshaft of the engine 11 rotates to a predetermined crank angle. The crank angle and an engine rotation speed are sensed based on the output signal outputted by the crank angle sensor 26. An accelerator position sensor 29 senses an accelerator position (an accelerator manipulation amount) Ap. A vehicle speed sensor 30 sensed a vehicle speed Vs.

Outputs of the above sensors are inputted into an engine control unit (ECU) 27. The ECU 27 is structured centering on a microcomputer. The ECU 27 executes various engine control programs stored in incorporated ROM (a storage medium) to control a fuel injection quantity of the fuel injection valve 20 or ignition timing of the ignition plug 21 in accordance with an operating state of the engine 11.

The ECU 27, the throttle valve 15, the throttle motor 28, the throttle position sensor 16, the accelerator position sensor 29 and the like constitute a throttle control system. The ECU 27 executes a program shown in FIG. 2 to calculate a target throttle angle THtgt based on the accelerator position Ap sensed by the accelerator position sensor 29 and senses the actual throttle angle THact with the use of the throttle position sensor 16. Thus, the ECU 27 feedback-controls the throttle motor 28 to make the actual throttle angle THact follow the target throttle angle THtgt. Thus, the ECU 27 controls the throttle valve 15.

Figure 2:
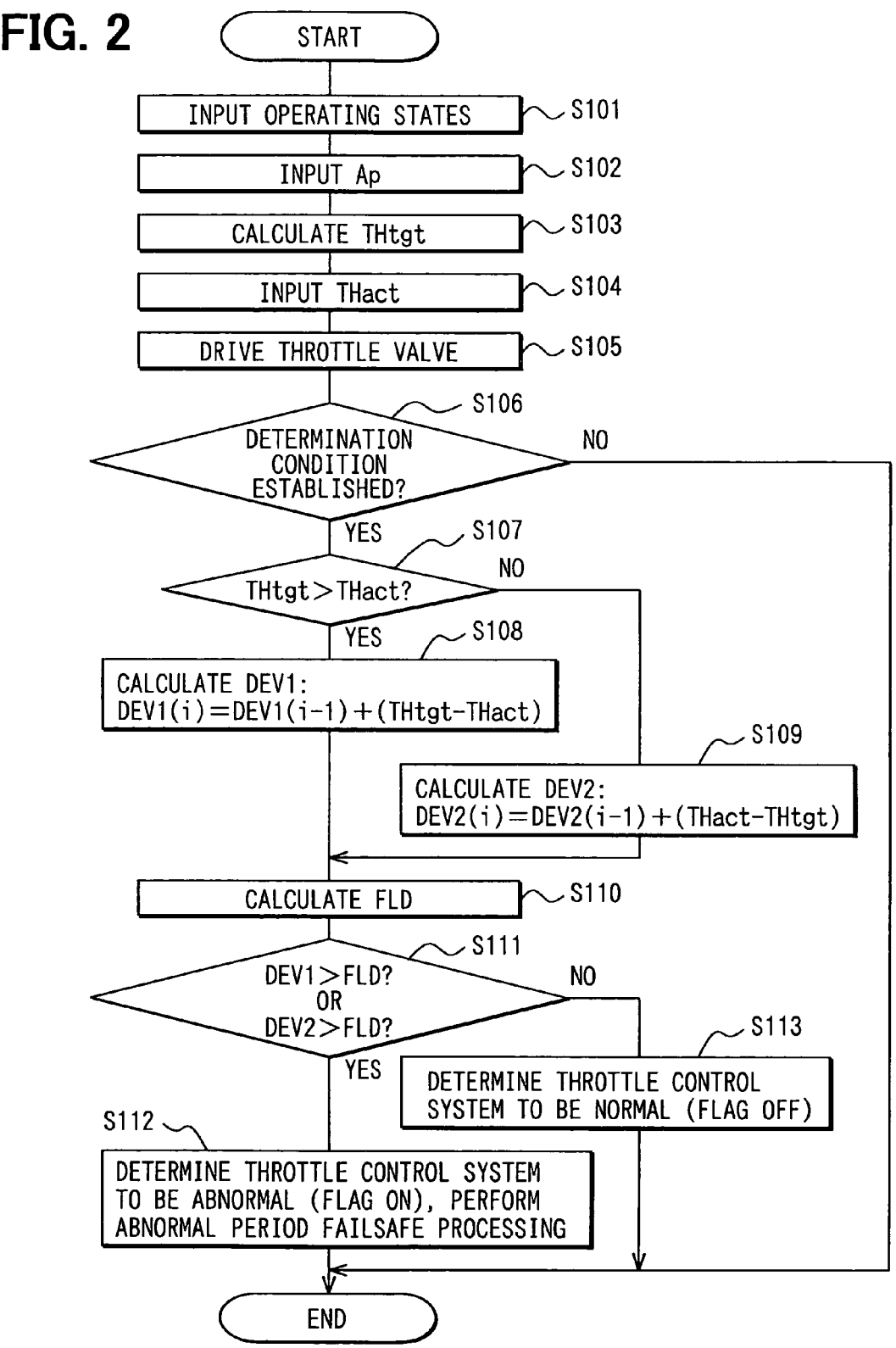
FIG. 2 is a flowchart showing a throttle control and throttle angle abnormality determination program according to the first embodiment.

The ECU 27 executes the program shown in FIG. 2 to calculate an integrated value DEV of a deviation between the actual throttle angle THact and the target throttle angle THtgt. Then, the ECU 27 determines existence or nonexistence of an abnormality in the throttle control system (an abnormality of the throttle angle) by comparing the integrated value DEV with an abnormality determination value FLD. At that time, the abnormality determination value FLD is changed in accordance with the vehicle speed Vs sensed by the vehicle speed sensor 30. Thus, the abnormality in the throttle control system can be detected in its early stage if the abnormality occurs in the throttle control system in a low-speed traveling period (a period when the throttle angle is small) in which an influence of the abnormality in the throttle control system on the operating state of the engine 11 is enlarged.

Next, processing based on the throttle control and throttle angle abnormality determination program, which is executed by the ECU 27, will be explained based on FIG. 2.

The throttle control and throttle angle abnormality determination program shown in FIG. 2 is executed in a predetermined cycle after an ignition switch is turned on, for instance. If the program shown in FIG. 2 is started, operating states of the vehicle and the engine 11 such as the vehicle speed Vs sensed by the vehicle speed sensor 30 are inputted in Step S101, first.

Then, in Step S102, the accelerator position Ap sensed by the accelerator position sensor 29 is inputted. Then, in Step S103, the target throttle angle THtgt is calculated based on the accelerator position Ap and the like. Then, in Step S104, the actual throttle angle THact sensed by the throttle position sensor 16 is inputted. Then, in Step S105, the throttle motor 28 is feedback-controlled to make the actual throttle angle THact follow the target throttle angle THtgt. Thus, the throttle valve 15 is driven to the target throttle angle THtgt.

Then, in Step S106, it is determined whether a predetermined abnormality determination performing condition is established based on whether a battery voltage is at a normal value or not. If the result of the determination in Step S106 is "NO", the program is ended without performing abnormality determination processing of step S107 and following steps.

If the result of the determination in Step S106 "YES", the abnormality determination processing of Step S107 and the following steps is performed as follows. First, in Step S107, it is determined whether the target throttle angle THtgt is greater than the actual throttle angle THact.

If the result of the determination in Step S107 is "YES", the program proceeds to Step S108 and an integrated value DEV1 of the deviation between the target throttle angle THtgt and the actual throttle angle THact is calculated based on a following equation (1).

$$DEV1(i)=DEV1(i-1)+(THtgt-THact), \quad (1)$$

If the result of the determination in Step S107 is "NO", the program proceeds to Step S109 and an integrated value DEV2 of the deviation between the actual throttle angle THact and the target throttle angle THtgt is calculated based on a following equation (2).

$$DEV2(i)=DEV2(i-1)+(THact-THtgt), \quad (2)$$

The integrated values DEV1(i), DEV2(i), which are calculated by the integration calculation performed in the last predetermined period, should be preferably employed.

Figure 3:
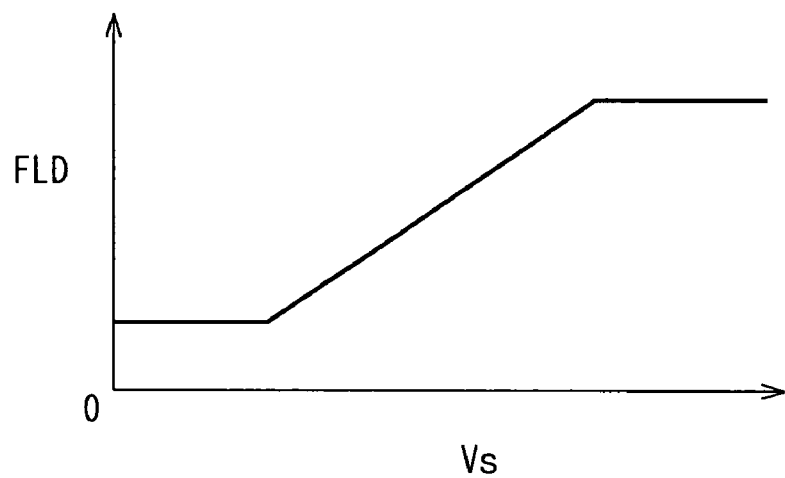
FIG. 3 is a map showing an abnormality determination value according to the first embodiment.

After the processing of Step S108 or Step S109, the abnormality determination value FLD corresponding to the present vehicle speed Vs is calculated in Step S110 by using a map shown in FIG. 3 or a formula. Generally, the throttle angle is smaller in the low-speed traveling period than in the high-speed traveling period. Therefore, the influence of the abnormality in the throttle control system on the operating state of the engine 11 is greater in the low-speed traveling period than in the high-speed traveling period. Therefore, the map shown in FIG. 3 is set so that the abnormality determination value FLD becomes smaller in the low-speed traveling period than in the high-speed traveling period. Thus, the abnormality in the throttle control system can be detected earlier in the low-speed traveling period than in the high-speed traveling period.

Then, in Step S111, it is determined whether the integrated value DEV1 of the deviation between the target throttle angle THtgt and the actual throttle angle THact is greater than the abnormality determination value FLD, or it is determined whether the integrated value DEV2 of the deviation between the actual throttle angle THact and the target throttle angle THtgt is greater than the abnormality determination value FLD.

If the result of the determination in Step S111 is "YES", the program proceeds to Step S112. In Step S112, it is determined that the abnormality exists in the throttle control system, and an abnormality flag is set at an ON-position (FLAG=1) in Step S112. Meanwhile, abnormal period failsafe processing is performed in Step S112. In the abnormal period failsafe processing, energization of the throttle motor 28 is turned off and the throttle valve 15 is compulsorily held at a predetermined angle with the use of a spring and the like. For instance, the predetermined angle is an angle at which an air intake quantity necessary for the vehicle to travel to a safe place can be ensured. Meanwhile, warning is provided to the vehicle driver by turning on a warning lamp mounted in an instrument panel in front of a driver's seat or by indicating a warning sign on a warning indication portion of the instrument panel in the abnormal period failsafe processing. Meanwhile, abnormality information (an abnormal code, etc.) is stored into a non-volatile memory such as backup RAM of the ECU 27, which can be erased and rewritten, in the abnormal period failsafe processing. Then, the program is ended.

If the result of the determination in Step S111 is "NO", the program proceeds to Step S113. In Step S113, it is determined that the throttle control system is normal, and the program is ended.

Figure 4:
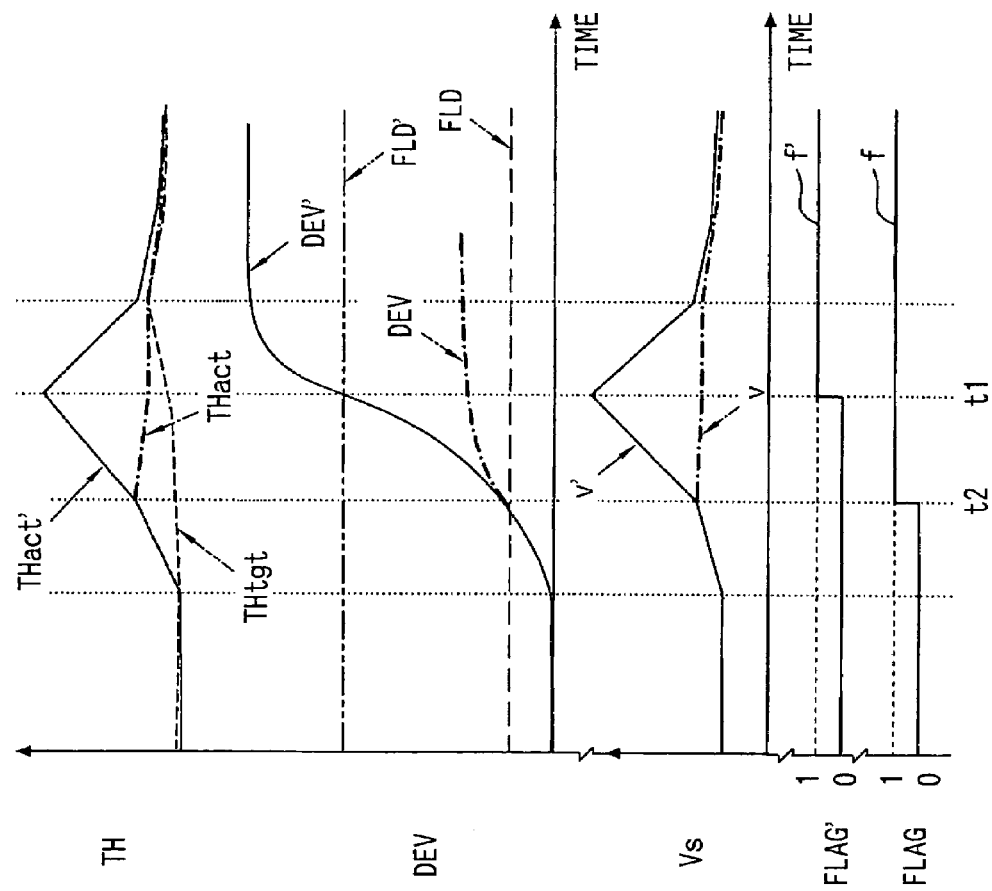
FIG. 4 is a time chart showing abnormality determination according to the first embodiment.

In the abnormality determination of the related art, the abnormality determination value FLD' used in the low-speed traveling period is the same as the abnormality determination value FLD' used in the high-speed traveling period as shown by the double-dashed line FLD' in FIG. 4. In this case, also in the low-speed traveling period, it is determined that the abnormality exists in the throttle control system and the failsafe processing is started at the time point t1 when the integrated value DEV' of the deviation between the actual throttle angle THact' and the target throttle angle THtgt exceeds the abnormality determination value FLD', which is the same as the determination value FLD' used in the high-speed traveling period. However, the influence of the abnormality in the throttle control system on the operating state of the engine is greater in the low-speed traveling period than in the high-speed traveling period. Therefore, in the low-speed traveling period, the rate of the increase in the vehicle speed Vs due to the abnormal operation of the actual throttle angle THact', which is performed during a period from the time point when the abnormality is generated to the time point t1 when it is determined that the abnormality exists, is increased as shown by the solid line v' in FIG. 4. As a result, there is a possibility that the vehicle driver feels the acceleration shock and the like.

In contrast, in the abnormality determination of the first embodiment, taking into account the fact that the influence of the abnormality in the throttle control system on the operating state of the engine 11 becomes greater in the low-speed traveling period than in the high-speed traveling period, the abnormality determination value FLD shown by a broken line FLD in FIG. 4 is changed in accordance with the vehicle speed Vs so that the abnormality determination value FLD becomes smaller in the low-speed traveling period than in the high-speed traveling period as shown in FIG. 3. Therefore, if the abnormality occurs in the throttle control system in the low-speed traveling period, it is determined that the integrated value DEV (the value DEV1 or the value DEV2) of the deviation between the actual throttle angle THact and the target throttle angle THtgt exceeds the abnormality determination value FLD and the abnormality exists at a time point t2 in FIG. 4, which is earlier than the time point t1 of the related art, and the failsafe processing is started. A chained line THact in FIG. 4 indicates the actual throttle angle THact of the present embodiment, and a chained line DEV is the integrated value DEV of the present embodiment. The flag indicating the existence of the abnormality in the throttle control system is set at 1 (FLAG=1) at the time point t2 as shown by a solid line "f" in FIG. 4. Thus, the amount of the abnormal operation performed until the time point t2 when it is determined that the abnormality exists can be reduced than ever before. As a result, the change in the vehicle speed Vs due to the abnormal operation can be reduced as shown by a chained line "v" in FIG. 4 and the acceleration shock and the like can be reduced.

Moreover, taking into account the fact that the influence of the abnormality in the throttle control system on the operating state of the engine 11 becomes smaller in the high-speed traveling period than in the low-speed traveling period, the abnormality determination value FLD is set to a greater value in the high-speed traveling period than in the low-speed traveling period in the abnormality determination of the present embodiment. Therefore, if the abnormality occurs in the throttle control system in the high-speed traveling period, the abnormality can be detected highly accurately. Thus, abnormality determination accuracy in the high-speed traveling period can be improved.

In the present embodiment, the abnormality determination value FLD is changed in accordance with the vehicle speed Vs. Alternatively, the abnormality parameter (the integrated value DEV of the deviation between the actual throttle angle THact and the target throttle angle THtgt) may be corrected in accordance with the vehicle speed Vs. The point is to change a condition for determining the abnormality in the throttle control system (an abnormality determination condition) so that the abnormality can be detected earlier in the low-speed traveling period than in the high-speed traveling period.

(Second Embodiment)

Next, processing based on a throttle motor overcurrent abnormality determination program, which is executed by the ECU 27, according to a second embodiment of the present invention will be explained based on FIGS. 5 to 7.

Figure 5:
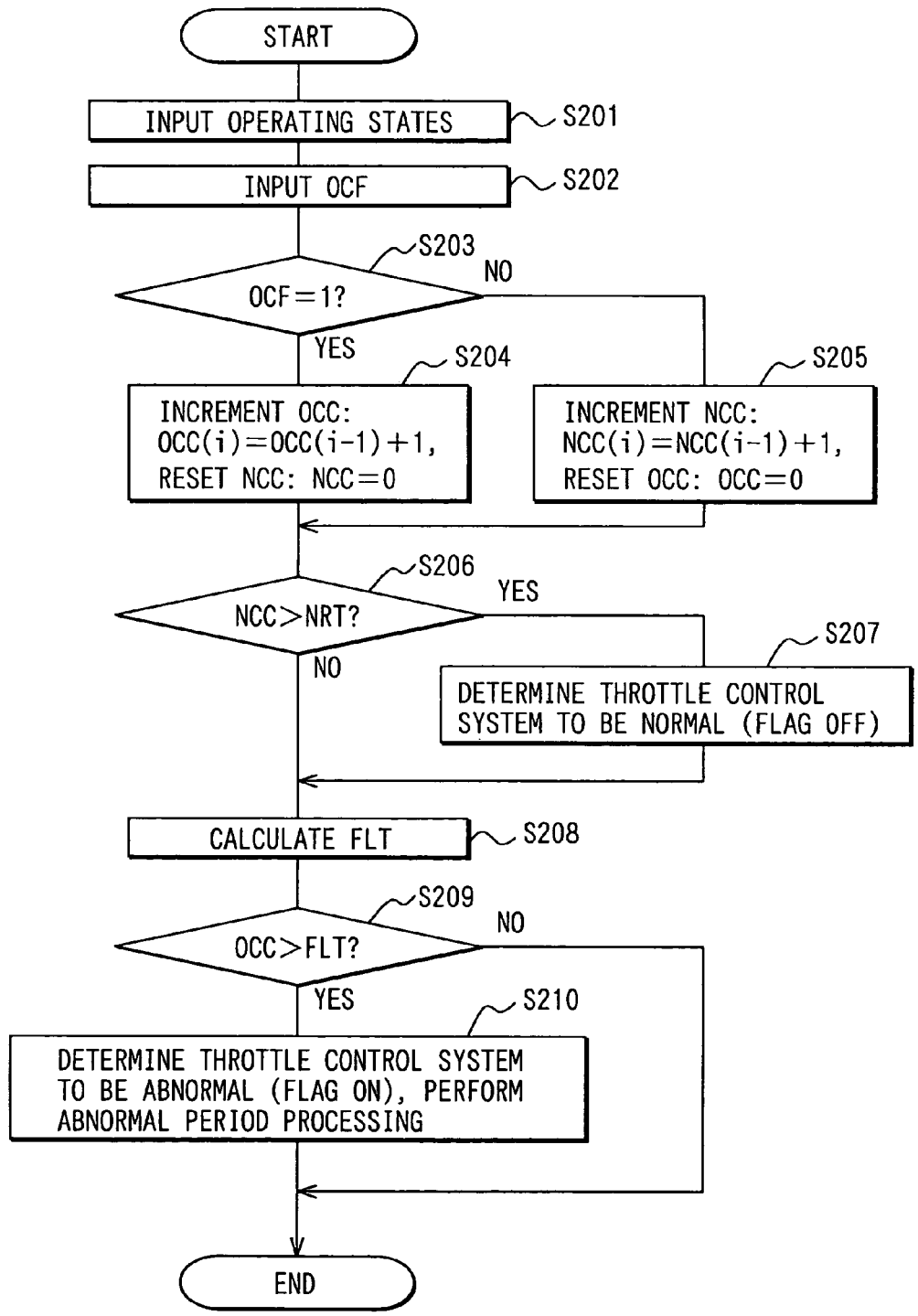
FIG. 5 is a flowchart showing a throttle motor overcurrent abnormality determination program according to a second embodiment of the present invention.

In the second embodiment, the ECU 27 executes the program shown in FIG. 5 to calculate duration of a state in which an overcurrent flows through the throttle motor 28. Then, the ECU 27 determines existence or nonexistence of an abnormality in the throttle control system (an overcurrent abnormality of the throttle motor 28) by comparing the duration with an abnormality determination period FLT. The ECU 27 changes the abnormality determination period FLT in accordance with the vehicle speed Vs sensed by the vehicle speed sensor 30. Thus, if the vehicle speed Vs decreases (if the throttle opening degree decreases) and the influence of the abnormality in the throttle control system on the operating state of the engine 11 increases, the abnormality in the throttle control system can be detected in its early stage.

The overcurrent abnormality determination program shown in FIG. 5 is executed in a predetermined cycle after an ignition switch is turned on, for instance. If the program is started, first, in Step S201, the operating states of the vehicle and the engine 11 such as the vehicle speed Vs sensed by the vehicle speed sensor 30 are inputted. Then, in Step S202, setting of a motor overcurrent flag OCF is inputted. The motor overcurrent flag OCF is set at 1 when the overcurrent flows through the throttle motor 28.

Then, in Step S203, it is determined whether the overcurrent is flowing through the throttle motor 28 based on whether the motor overcurrent flag OCF is set at 1 or not.

If the result of the determination in Step S203 is "YES" (OCF=1), the program proceeds to Step S204. In Step S204, an abnormality detection counter OCC is incremented by one (OCC(i)=OCC(i−1)+1), and a normality detection counter NCC is reset to zero (NCC=0). The abnormality detection counter OCC is used for measuring the duration of the state in which the overcurrent flows through the throttle motor 28.

If the result of the determination in Step S203 is "NO" (OCF=0), the program proceeds to Step S205. In Step S205, the normality detection counter NCC is incremented by one (NCC(i)=NCC(i−1)+1) and the abnormality detection counter OCC is reset to zero (OCC=0). The normality detection counter NCC is used for measuring duration of a state in which the overcurrent does not flow through the throttle motor 28.

After the processing of Step S204 or Step S205, it is determined whether the normality detection counter NCC is greater than a normality determination period NRT in Step S206.

Figure 6:
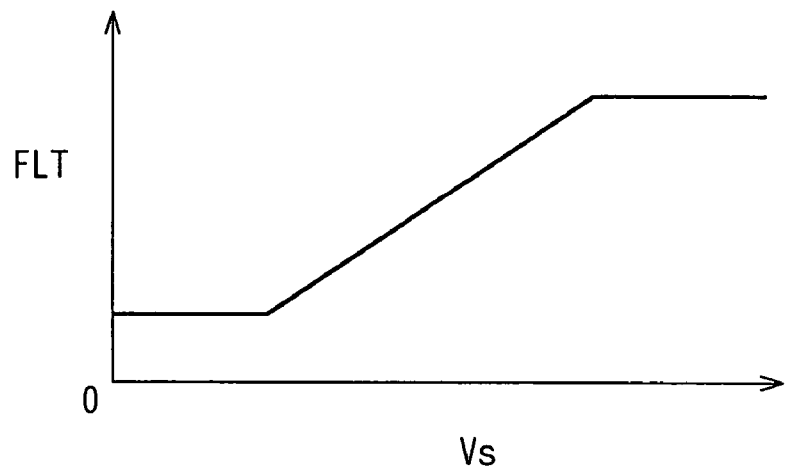
FIG. 6 is a map showing an abnormality determination period according to the second embodiment.

If the result of the determination in Step S206 is "NO", the program proceeds to Step S208 and the abnormality determination period FLT corresponding to the present vehicle speed Vs is calculated by using a map shown in FIG. 6 or a formula. The map shown in FIG. 6 is set so that the abnormality determination period FLT becomes smaller in the low-speed traveling period than in the high-speed traveling period. Thus, the abnormality in the throttle control system can be detected earlier in the low-speed traveling period than in the high-speed traveling period.

After the abnormality determination period FLT is calculated, the program proceeds to Step S209. In Step S209, it is determined whether the abnormality detection counter OCC is greater than the abnormality determination period FLT.

If the result of the determination in Step S209 is "YES", the program proceeds to Step S210. In Step S210, it is determined that an abnormality exists in the throttle control system (the overcurrent abnormality of the throttle motor 28 exists) and an abnormality flag is set at an ON-position (FLAG=1). Meanwhile, abnormal period processing is performed in Step S210.

If the result of the determination in Step S206 is "YES", the program proceeds to Step S207 and it is determined that the throttle control system is normal (the overcurrent abnormality of the throttle motor 28 does not exist).

Figure 7:
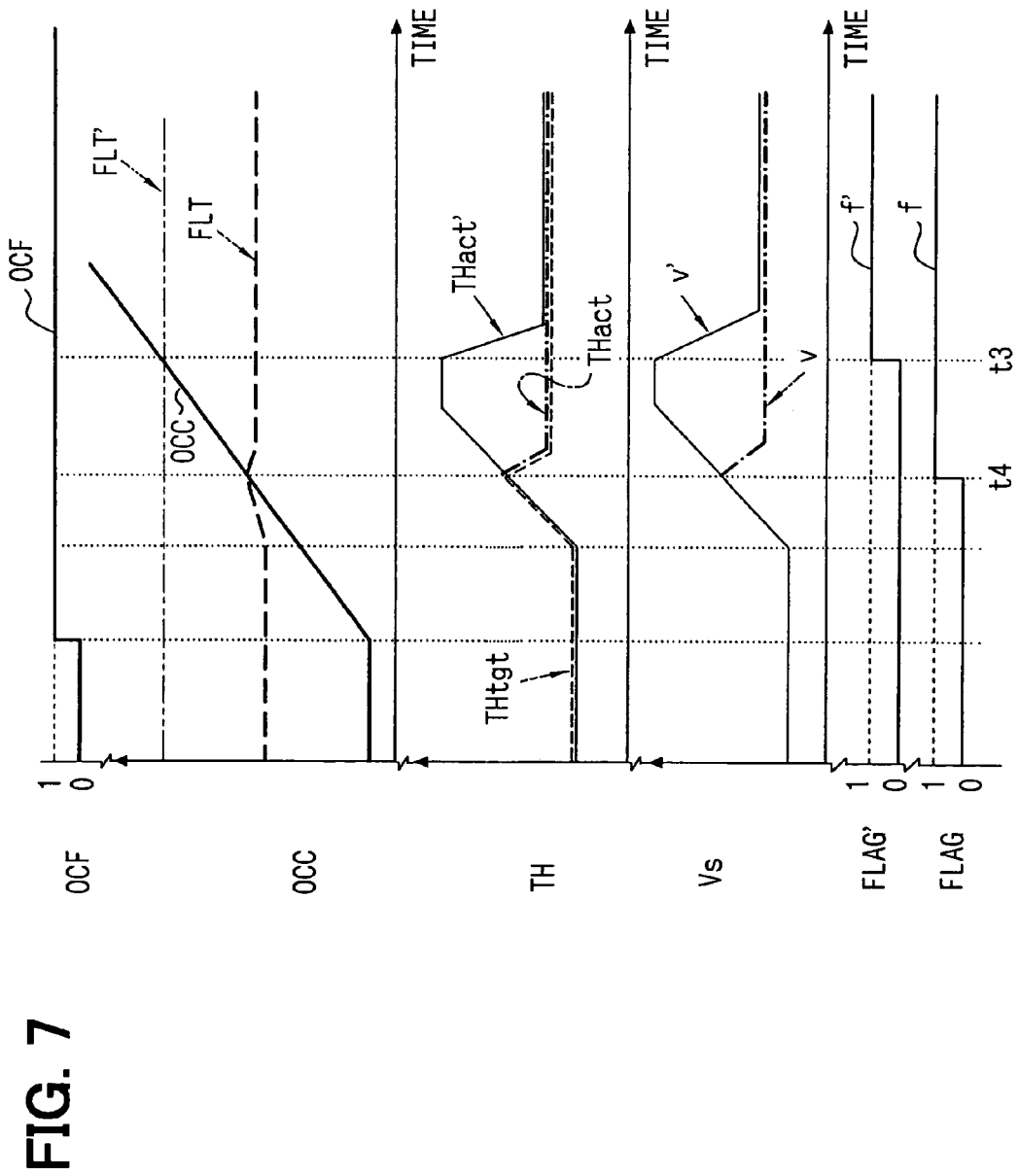
FIG. 7 is a time chart showing abnormality determination according to the second embodiment.

As shown in FIG. 7, in the abnormality determination of the related art, the abnormality determination period FLT' (shown by a double-dashed line FLT') used in the high-speed traveling period is also used in the low-speed traveling period. Therefore, even in the low-speed traveling period, it is determined that the abnormality exists in the throttle control system at a time point t3 when the abnormality detection counter OCC exceeds the abnormality determination period FLT', which is also used in the high-speed traveling period, and the failsafe processing is started. However, the abnormality in the throttle control system caused in the low-speed traveling period has a significant influence on the operating state of the engine. Therefore, the rate of the increase of the vehicle speed Vs due to the abnormal operation of the actual throttle angle THact', which is performed during a period from the time point when the abnormality is generated to the time point t3 when it is determined that the abnormality exists, is increased as shown by a solid line v' in FIG. 7. As a result, there is a possibility that the vehicle driver feels the acceleration shock and the like.

In contrast, in the abnormality determination of the second embodiment, the abnormality determination period FLT (shown by a broken line FLT in FIG. 7) is changed in accordance with the vehicle speed Vs so that the abnormality determination period FLT becomes smaller in the low-speed traveling period than in the high-speed traveling period as shown in FIG. 6. Therefore, in the low-speed traveling period, in which the influence of the abnormality in the throttle control system on the operating state of the engine 11 increases, it is determined that the abnormality exists and the failsafe processing is started when the abnormality detection counter OCC exceeds the abnormality determination period FLT, or at a time point t4 earlier than the time point t3 of the related art. Thus, the amount of the abnormal operation of the actual throttle angle THact during a period from the time point when the abnormality is generated to the time point t4 when it is determined that the abnormality exists can be reduced. Thus, the change in the vehicle speed Vs due to the abnormal operation can be reduced as shown by a chained line "v" in FIG. 7, and the acceleration shock and the like can be reduced.

In the second embodiment, the abnormality determination period FLT is changed in accordance with the vehicle speed Vs. Alternatively, the abnormality parameter (the abnormality detection counter OCC) may be corrected in accordance with the vehicle speed Vs. The point is to change the abnormality determination condition so that the abnormality in the throttle control system can be detected earlier in the low-speed traveling period than in the high-speed traveling period.

In the first and second embodiments, the abnormality determination condition such as the abnormality determination value, the abnormality determination period, or the abnormality parameter is changed in accordance with the vehicle speed Vs. Alternatively, the abnormality determination condition such as the abnormality determination value, the abnormality determination period, or the abnormality parameter may be changed in accordance with the air intake quantity, the intake pipe pressure and the like.

Generally, the throttle angle becomes smaller in a light-load period (a period in which the air intake quantity is small and the negative pressure in the intake pipe is large) than in a heavy-load period (a period in which the air intake quantity is large and the negative pressure in the intake pipe is small). Therefore, the influence of the abnormality in the throttle control system on the operating state of the engine 11 becomes larger in the light-load period than in the heavy-load period.

Therefore, in the case where the abnormality determination condition is changed in accordance with the air intake quantity, the abnormality determination condition should be preferably changed so that the abnormality in the throttle control system can be detected earlier when the air intake quantity is small than when the air intake quantity is large. In the case where the abnormality determination condition is changed in accordance with the intake pipe pressure, the abnormality determination condition should be preferably changed so that the abnormality in the throttle control system can be detected earlier when the negative pressure in the intake pipe is large than when the negative pressure in the intake pipe is small. Thus, the abnormality can be detected in its early stage if the abnormality occurs in the throttle control system in the light-load period, in which the influence of the abnormality in the throttle control system on the operating state of the engine 11 increases.

The abnormality determination condition may be changed in accordance with operating state information of the vehicle and the engine such as the engine rotation speed or a gear position, other than the vehicle speed Vs, the air intake quantity, or the intake pipe pressure.

In the first and second embodiments, the present invention is applied to the abnormality determination of the throttle control system (the abnormality determination of the throttle angle or the overcurrent abnormality determination of the throttle motor 28). Other than that, the present invention can be applied to abnormality determination of the throttle valve 15, the throttle position sensor 16, the throttle motor 28, the accelerator position sensor 29, the ECU 27, a computer or a control area network (CAN) communication system related to the throttle control, a cruise control system and the like. Thus, the present invention can be applied to the abnormality determination of the throttle control system, or the parts or the systems related to the throttle control system.

The present invention should not be limited to the disclosed embodiments, but may be implemented in many other ways without departing from the spirit of the invention.

What is claimed is:

1. An abnormality determination apparatus of a throttle control system, which includes a throttle valve of an internal combustion engine mounted in a vehicle and a throttle actuator for actuating the throttle valve and controls an angle of the throttle valve by controlling the throttle actuator, the abnormality determination apparatus comprising:

determining means for determining existence or nonexistence of an abnormality in a throttle system including the throttle control system and parts related to the throttle control system, based on an abnormality determination condition; and changing means for changing the abnormality determination condition in accordance with operating states of the vehicle and/or the engine so that the abnormality in the throttle system can be detected earlier in an operating area where an influence of the abnormality in the throttle system on the operating state of the engine is significant than in an operating area where the influence of the abnormality in the throttle system on the operating state of the engine is insignificant.

2. The abnormality determination apparatus as in claim 1, wherein the determining means determines the existence or nonexistence of the abnormality in the throttle system by calculating an abnormality parameter indicating a degree of the abnormality based on a deviation between an actual control amount and a target control amount of the throttle system, and by comparing the abnormality parameter with a predetermined abnormality determination value as the abnormality determination condition, and the changing means changes the abnormality determination value in accordance with the operating states.

3. The abnormality determination apparatus as in claim 1, wherein the determining means determines the existence or nonexistence of the abnormality in the throttle system by measuring duration of a state in which the throttle system is in a predetermined abnormal state, and by comparing the duration with a predetermined determination period as the abnormality determination condition, and the changing means changes the abnormality determination period in accordance with the operating states.

4. The abnormality determination apparatus as in claim 1, wherein the changing means employs a vehicle speed as information of the operating states.

5. The abnormality determination apparatus as in claim 4, wherein
the changing means changes the abnormality determination condition so that the abnormality in the throttle system can be detected earlier in a low-speed traveling period, in which the vehicle travels at a relatively low speed, than in a high-speed traveling period, in which the vehicle travels at a relatively high speed.

6. The abnormality determination apparatus as in claim 4, wherein
the changing means changes the abnormality determination condition so that an abnormality determination value becomes small in an operating area where the vehicle speed is low.

7. The abnormality determination apparatus as in claim 1, wherein
the changing means employs an air intake quantity as information of the operating states.

8. The abnormality determination apparatus as in claim 7, wherein
the changing means changes the abnormality determination condition so that the abnormality can be detected earlier when the air intake quantity is relatively small than when the air intake quantity is relatively large.

9. The abnormality determination apparatus as in claim 1, wherein
the changing means employs an intake pipe pressure of an intake pipe as information of the operating states.

10. The abnormality determination apparatus as in claim 9, wherein
the changing means changes the abnormality determination condition so that the abnormality in the throttle system can be detected earlier when a negative pressure in the intake pipe is relatively large than when the negative pressure in the intake pipe is relatively small.

11. A method of determining an abnormality of a throttle control system, which includes a throttle valve of an internal combustion engine mounted in a vehicle and a throttle actuator for actuating the throttle valve and controls an angle of the throttle valve by controlling the throttle actuator, the method comprising:
determining existence or nonexistence of an abnormality in a throttle system including the throttle control system and parts related to the throttle control system, based on an abnormality determination condition; and
changing the abnormality determination condition in accordance with operating states of the vehicle and/or the engine so that the abnormality in the throttle system can be detected earlier in an operating area where an influence of the abnormality in the throttle system on the operating state of the engine is significant than in an operating area where the influence of the abnormality in the throttle system on the operating state of the engine is insignificant.

12. The method as in claim 11, wherein
the existence or nonexistence of the abnormality in the throttle system is determined by calculating an abnormality parameter indicating a degree of the abnormality based on a deviation between an actual control amount and a target control amount of the throttle system, and by comparing the abnormality parameter with a predetermined abnormality determination value as the abnormality determination condition, and
the abnormality determination value is changed in accordance with the operating states.

13. The method as in claim 11, wherein
the existence or nonexistence of the abnormality in the throttle system is determined by measuring duration of a state in which the throttle system is in a predetermined abnormal state, and by comparing the duration with a predetermined determination period as the abnormality determination condition, and
the abnormality determination period is changed in accordance with the operating states.

14. The method as in claim 11, wherein
a vehicle speed is employed as information of the operating states for changing the abnormality determination condition.

15. The method as in claim 14, wherein
the abnormality determination condition is changed so that the abnormality in the throttle system can be detected earlier in a low-speed traveling period, in which the vehicle travels at a relatively low speed, than in a high-speed traveling period, in which the vehicle travels at a relatively high speed.

16. The method as in claim 11, wherein
an air intake quantity is employed as information of the operating states for changing the abnormality determination condition.

17. The method as in claim 16, wherein
the abnormality determination condition is changed so that the abnormality can be detected earlier when the air intake quantity is relatively small than when the air intake quantity is relatively large.

18. The method as in claim 11, wherein
an intake pipe pressure of an intake pipe is employed as information of the operating states for changing the abnormality determination condition.

19. The method as in claim 18, wherein
the abnormality determination condition is changed so that the abnormality in the throttle system can be detected earlier when a negative pressure in the intake pipe is relatively large than when the negative pressure in the intake pipe is relatively small.

20. The method as in claim 11, wherein a value of the abnormality determination condition decreases in an operating area where the vehicle speed decreases.

* * * * *